(12) United States Patent
Kansal et al.

(10) Patent No.: US 7,912,289 B2
(45) Date of Patent: Mar. 22, 2011

(54) IMAGE TEXT REPLACEMENT

(75) Inventors: Aman Kansal, Issaquah, WA (US); Feng Zhao, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 994 days.

(21) Appl. No.: 11/743,048

(22) Filed: May 1, 2007

(65) Prior Publication Data
US 2008/0273796 A1 Nov. 6, 2008

(51) Int. Cl.
G06K 9/03 (2006.01)
G06K 9/32 (2006.01)
G06K 15/00 (2006.01)
G06F 3/048 (2006.01)
G06F 17/28 (2006.01)

(52) U.S. Cl. ........ 382/181; 382/294; 382/310; 715/763; 704/2; 358/1.18

(58) Field of Classification Search .......... 382/181, 382/310, 229, 294; 715/205, 771, 277, 236, 715/234, 781, 788, 762, 763, 765; 348/E7.033; 358/1.18, 406, 452; 714/E11.171; 704/2, 704/251, 256.1, 256, 8
See application file for complete search history.

(56) References Cited

U.S. PATENT DOCUMENTS

| | | | |
|---|---|---|---|
| 6,047,251 A | 4/2000 | Pon et al. | |
| 6,101,274 A * | 8/2000 | Pizano et al. | 382/176 |
| 6,453,462 B1 * | 9/2002 | Meade et al. | 717/124 |
| 6,470,094 B1 * | 10/2002 | Lienhart et al. | 382/176 |
| 6,587,586 B1 * | 7/2003 | Cui et al. | 382/176 |
| 6,608,930 B1 * | 8/2003 | Agnihotri et al. | 382/176 |
| 7,031,553 B2 * | 4/2006 | Myers et al. | 382/289 |
| 7,493,250 B2 * | 2/2009 | Hecht et al. | 704/3 |
| 7,509,251 B2 * | 3/2009 | Andrews et al. | 704/8 |
| 7,593,605 B2 * | 9/2009 | King et al. | 382/313 |
| 2002/0159636 A1 | 10/2002 | Lienhart et al. | |
| 2004/0125877 A1 | 7/2004 | Chang et al. | |
| 2005/0196043 A1 | 9/2005 | Jung et al. | |
| 2007/0044013 A1 * | 2/2007 | Hyatt | 715/515 |

FOREIGN PATENT DOCUMENTS

WO WO02095662 A1 11/2002
WO WO2006103625 A1 10/2006

OTHER PUBLICATIONS

Lyu, et al., "A Multilingual, Multimodal Digital Video Library System", retrieved at <<http://www.cse.cuhk.edu.hk/~lyu/paper_pdf/p77-lyu.pdf>>, The Chines University of Hong Kong, JDCL' 02, Jul. 13-17, 2002, pp. 9.
Matas, et al., "A New Class of Learnable Detectors for Categorisation," Proceedings of 14th Scandianavian Conference on Image Analysis (SCIA '05), LNCS 3540, 2005, pp. 541-550.
Mori, "Video text recognition using feature compensation as category-dependent feature extraction", retrieved at << http://www.cse.salford.ac.uk/prima/ICDAR2003/Papers/0117_571_minoru_m.pdf>> NTT Corporation, IEEE2003, pp. 5.
"Video Text Recognition", retrieved on Dec. 7, 2006, at <<http://www.sri.com/esd/automation/video_recog.html>>, SRI International, 2006, pp. 1-3.
Xi, et al., "A Video Text Detection and Recognition System" retrieved available as early as Dec. 6, 2006, at <<http://research.microsoft.com/asia/dload_files/group/mcomputing/ICME2001-XiJie-4th.pdf>> pp. 4.

* cited by examiner

*Primary Examiner* — Sheela C Chawan
(74) *Attorney, Agent, or Firm* — Lee & Hayes, PLLC

(57) ABSTRACT

Image text enhancement techniques are described. In an implementation, graphically represented text included in an original image is converted into process capable text. The process capable text may be used to generate a text image which may replace the original text to enhance the image. In further implementations the process capable text may be translated from a first language to a second language for inclusion in the enhanced image.

18 Claims, 4 Drawing Sheets

IMAGE TEXT REPLACEMENT

BACKGROUND

Text and textual information proliferates everyday life. Text presented in everyday life and in images may be incomprehensible for several reasons. For example, people suffering from poor vision or diseases of the eye may have difficulty reading text. In other instances, the text is incomprehensible because the reader does not understand the language.

A person suffering from poor visual acuity may not be able to discern the characters forming the text, in a picture or video, from the background of the text. Visually discerning text may be additionally difficult if the text is scripted, too small for observation (even for someone with normal vision), poorly written (presented), and so on. Languages which use many characters may be particularly difficult for people having poor vision as the reader may have to differentiate between several similar characters. The "written" or textual Chinese and Japanese languages may be particularly difficult as a large number of symbols are used to convey information, in comparison to Western languages in which a limited number of characters are implemented in a wide variety of combinations in order to communicate.

For persons unfamiliar with the language, non-comprehension occurs as the person does not posses the underlying knowledge of what information is being communicated. For example, a person conversant in the written English language may not understand French text. This comprehension issue may be particularly troublesome for people traveling in foreign countries. For example, a tourist traveling through Europe may be confronted with road-signs, menus, billboards or other text in several unfamiliar languages.

SUMMARY

Image text enhancement techniques are described. In an implementation, graphically represented text included in an original image is converted into process capable text. The process capable text may be used to generate a text image which may replace the original text to enhance the image. In further implementations the process capable text may be translated from a first language to a second language for inclusion in the enhanced image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques are described to implement text image enhancement. According to these techniques, original text within a captured image may be converted into process capable text. For example, original text in a pixilated image is converted to Unicode text which may be processed by a computer. The process capable text may be used to generate a text image of the process capable text, with the text image augmenting the original image to form an enhanced image. In further techniques, the process capable text is translated from a first human language into a second human language to provide a text image in the second human language. The foregoing techniques may be used to provide an image which promotes text comprehension over that of the text in the original image. In further implementations, the techniques may be used to translate foreign language text for images or in near real-time. A variety of other implementations are also contemplated, further discussion of which may be found in the following discussion.

In the following discussion, an exemplary environment is first described that is operable to implement image text enhancement. Exemplary procedures are then described that may be employed in the exemplary environment, as well as in other environments.

Exemplary Environment

Figure 1:
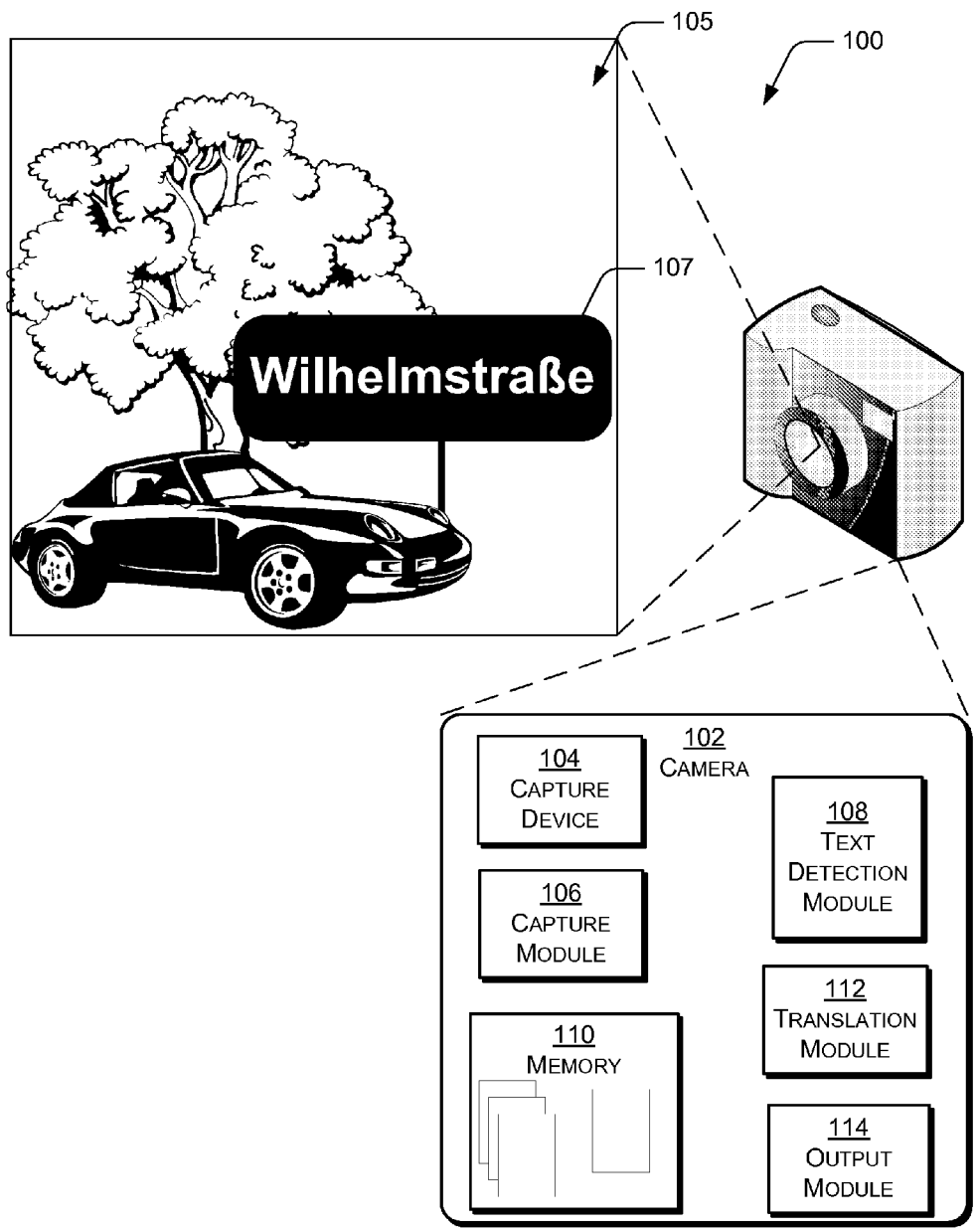
FIG. 1 is an illustration of an environment in an exemplary implementation that is operable to implement image text enhancement.

FIG. 1 is an illustration of an environment 100 in exemplary implementations employing a system configured to implement image text enhancement. While the present implementation is directed to a camera 102, other suitable devices include video cameras, cellular phones and smart phones having image functionality, a "heads-up" display for a vehicle, at least partially included in a computing device, included in a wearable device, such as a pair of glasses, and so on.

In the discussed implementation, a capture device 104 is included for obtaining an image. For instance, the capture device 104 may capture an image by using an optical detector having an array of light sensitive receptors to generate an image file. For discussion purposes, an image 105 including a car, a tree, and a street sign with original text is discussed. Further, the optical detector may vary according on the design preferences and the type of image desired.

While an integrated camera 102 is described, in other implementations, the system is included in a separate physical device from the capture device 104. For example, a standard digital camera may obtain an image file which is subsequently transferred to a computer for image text enhancement. The file image may be transferred via a memory card, communicated over a physical link or a wireless link, transferred via computer readable media, and so on.

A capture module 106 may be implemented to obtain an image or a frame included in a video file for enhancement. In other situations, the capture module 106 obtains multiple frames for text enhancement. For a video, the capture module 106 may obtain one or more frames (e.g., individual images) as desired for enhancement. For example, the capture module 106 may select individual frames for capture, select sequential frames, select a first frame in a sequence or permit user designation. A first frame may be based on a detectable image change, such the first occurrence of a billboard in a video.

An image file, whether a still image or a video image, may define the underlying subject matter as an arrangement of pixels having varying intensities, color, packing density, and so on. In the discussed example, the characters forming the original street sign text "Wilhelmstraße" 107 may be retained as a series of "dots" which form the letters. While a pixel graphical system is described, other suitable graphical methodologies include vector graphics and so on.

Additionally, the capture module 106 may manipulate the image to promote text recognition. For instance, the capture module 106 enhances the image by applying a Fourier transform, adjusting contrast, and so on. The foregoing techniques are applied while the original text is encoded as an image to promote text recognition. For example, the capture module 106 may improve the image by removing "bleeding" around the edge of the letter to provide a sharp contrast between the pixels forming the character and image background.

A text detection module 108 may be included for accessing an image file directly, or if a capture module 106 is used, the captured image may be forwarded to the text detection module 108. In other cases, the captured images (stored as image files) are stored in memory 110 for subsequent access.

The text detection module 108 may optically recognize the presence and the characters included in the original text. For example, the text detection module 108 optically recognizes an alphabetic letter or language symbol based on the character's boundary or outline. Thus, a pixilated letter "A" may be recognized based on periphery or edges of the character. Other suitable methodologies include, but are not limited to, one or more of neural network trained classifier, Category-Specific Extremal Region (CSER) Detection, detecting patterns, geometrical determination, texture estimation, contour based detection, detecting shapes belonging to categories, and so on. For example, a neural network trained classifier may recognize an image text region based on the included text shapes.

The text detection module 108 may generate process capable text which corresponds to the recognized original text. For example, using optical edge recognition, the text detection module 108 recognizes the presence of the word "right" based on the inclusion and arrangement of the characters "r"-"i"-"g"-"h"-"t" in the image.

Process capable text may include text in which the underlying encoded data permits computer manipulation of the content as text. For example, Unicode text may permit a computer to recognize the underlying 16-bits as representing a particular human language character, thereby permitting computer manipulation. In this way, a word processing program or other application may handle the letter "A" as part of a language schema, in contrast to a graphical system in which the language character is designated as an arrangement of pixels. For example, the text detection module 108 may recognize original text "Right Turn" and generate Unicode text "Right Turn". In further examples, process capable text may include formats which are based on Unicode text such as Unicode Transformation Format (UTF) 8, UTF-7, UTF-32 (UCS-4), and so on. For example, a Unicode character (text) corresponds to underlying "16 bits" which a computer may process as a symbol, rather than as a collection of pixels. In further implementations, the text detection module 108 may present a user override prompt, which allows a user to override the module function, or may provide a confidence level for the text conversion.

A translation module 112 may be included to translate the process capable text from a first language to a second language. The translation module 112 may implement a natural language algorithm to translate first human language text into second human language text. Suitable natural language algorithm methodologies may include, but are not limited to, one or more of the of the following methodologies in the algorithm: statistical text recognition, lookup tables or databases, artificial intelligence learning, predictive language modeling, pattern recognition, Good-Turing methodologies, and so on. For example, if the process capable text is in French, the translation module 112 may convert the process capable text into English based on statistical text analysis. Additionally, symbols occurring in the image may be implemented to provide context to enhance text recognition and accuracy.

For example, the translation module 112 is configured to translate the characters "de l'essence" into the English character equivalent of "gas." In this case, the translation is based on arrangement and the characters forming the text "de l'essence" and the inclusion of the term "de l'essence" within the original image. In regard to the example discussed with respect to FIG. 1, the text "Wilhelmstraße" 107 may be translated into the English equivalent of "Wilhelm Street."

To increase system efficiency, a user may select a predicted first language. Thus, while the user may not be able to recognize the underlying text information he/she may be able to input a "likely" first language such as "French" (as the user knows he/she is in France or has made some other observation) and direct the translation module 112 to translate the text within the image into English. If no suitable translation or match is found, the translation module 112 may provide a user warning and/or expand the search. The first language may be determined using a character which may distinguish the language, such as the Eszett or "B" which may identify the text as Germanic. In other instances, translation may be based on the character itself, such as when translating from Chinese to English.

Furthermore, the translation module 112 may be configured to recognize terms associated with trademarks, brand names, proper names and the like. For example, a database of proper names and trademarks is searched to identify text which may be maintained in the first language. For example, proper names in the English language may be recognized by a capital character or a series of adjacent words having capital letters.

Figure 2:
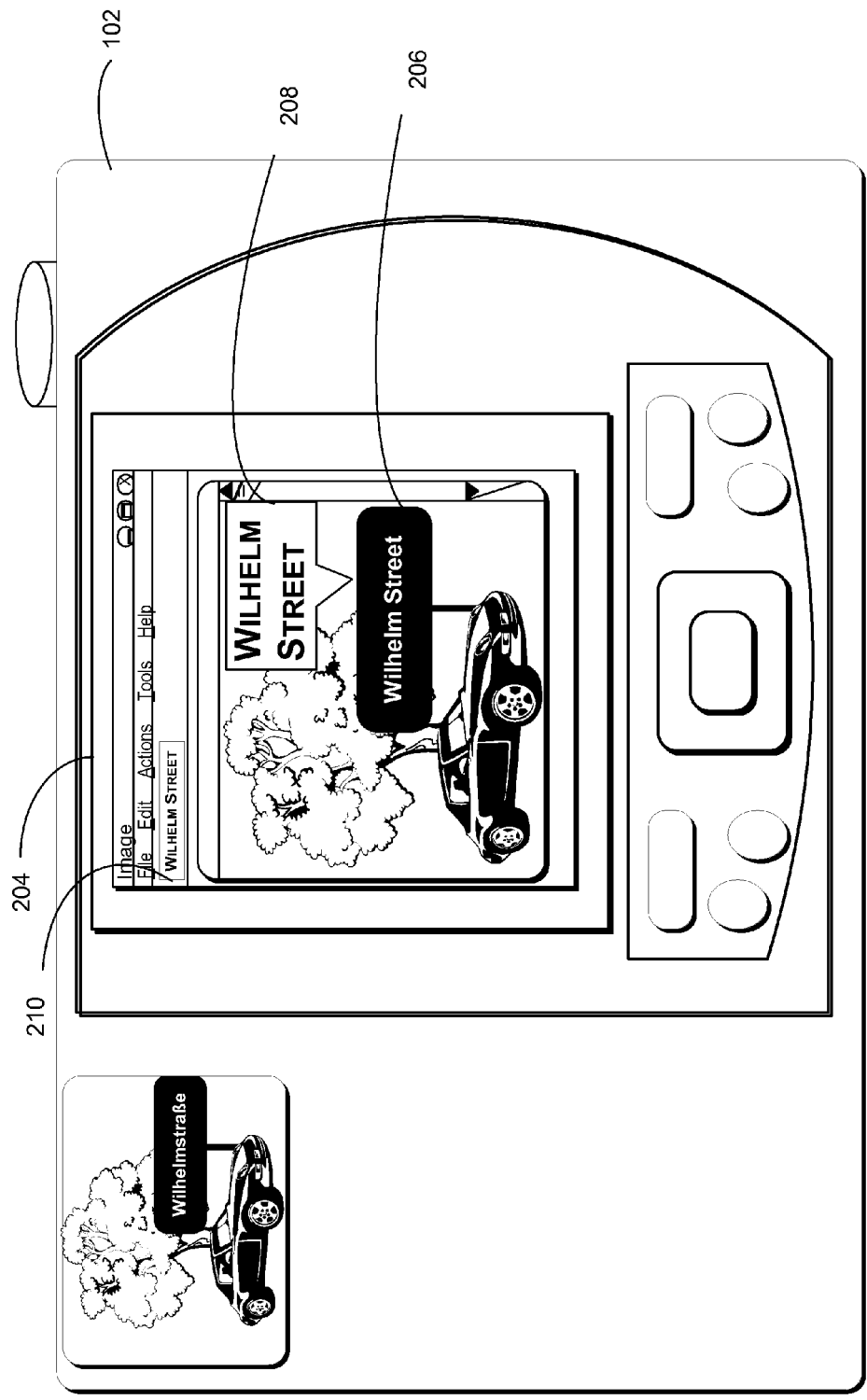
FIG. 2 is an illustration of an exemplary image text replacement output.

An output module 114 may be included to output an enhanced image. FIG. 2 illustrates an exemplary output displayed on a video screen included on the camera 102. The enhanced image 204 may include a text image 206 of the process capable text included in place of the original text, added as an augmentation to the original image. Augmenting may include adding the text image as a text balloon 208 to the enhanced image 204 and so on.

Upon user initiation, the output module 114 may query the text detection module 108 for the process capable text. In other implementations, the process capable text is forwarded to the output module 114, if the user has previously selected image text enhancement. Once the process capable text is obtained, and translated (if applicable), the output module 114 may generate a text image of the process capable text. For example, the output module 114 may generate a bit map of the process capable text for inclusion in the original image. In another example, the output module 114 may generate a bit map of the phrase "Right Turn Ahead" so that the bit map text image is located in place of original text. While a bit map is described, other images are available. For example, a text image is provided as a vector graphic image to minimize magnification issues. Thus, an enhanced image may include the text image, generated from the process capable text, in place of the original text included in the image.

In accordance with design and user preferences, the output module 114 may vary the text image in the following respects (in comparison to the original text): enlarged font size, provided in a different color scheme, provided in a different font, provided as a balloon overlay, enlarged text region, changed orientation, selected equivalent words with fewer characters, and so on to promote readability over the original text. Additionally, the output module 114 may include an "enhancement warning" on the enhanced image. For example, an enhancement warning is provided on the boarder of a printed copy of the enhanced image. Additional information may be included as well. For example, a text detection or translation confidence level may be included as a printed image border annotation.

In further implementations, the output module 114 annotates the enhanced image with process capable text. For example, the output module 114 may include an overlay with process capable text 210 to promote identification.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable media, memory devices, e.g., memory. The module may be formed as hardware, software, a hybrid of hardware and software, firmware, stored in memory, as a set of computer readable instructions embodied in electronically readable media, etc.

A variety of techniques may be used to enhance image text, further discussion of which may be found in relation to the following exemplary procedures.

Exemplary Procedures

The following discussion describes methodologies that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 3:
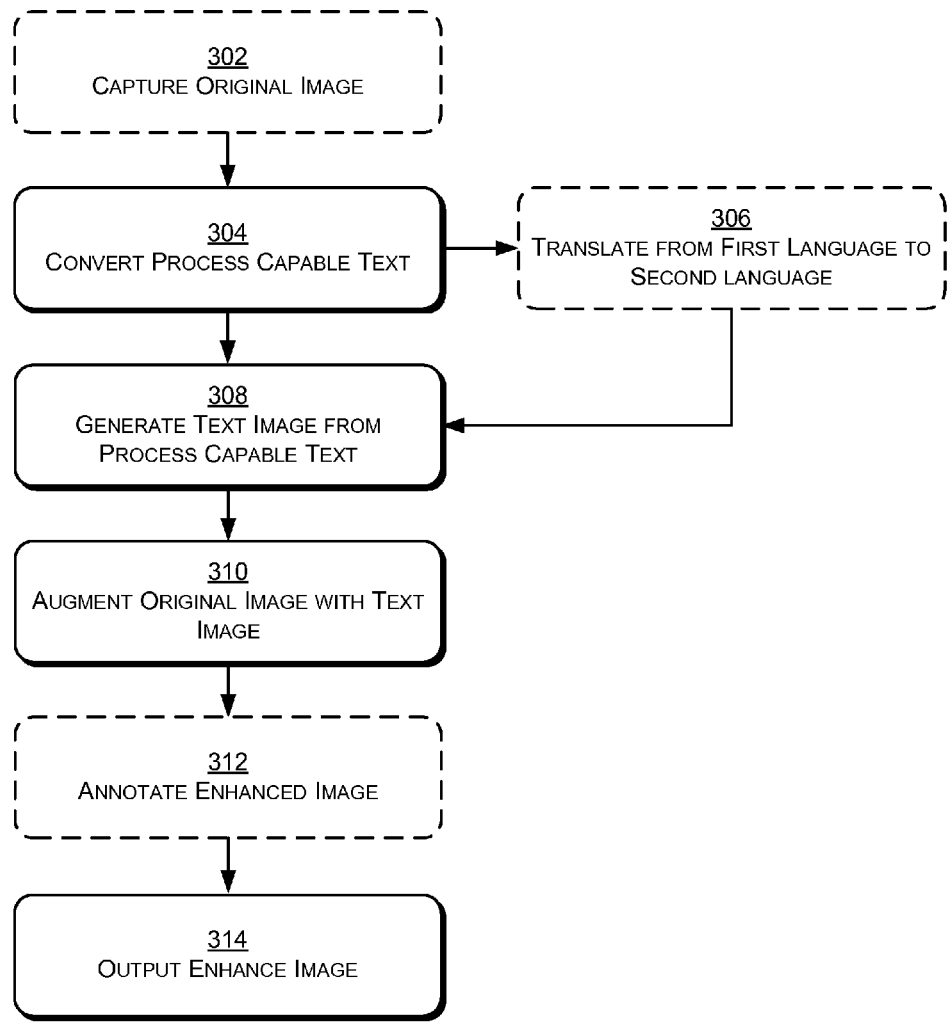
FIG. 3 is a flow diagram depicting a procedure in an exemplary implementation in which an image is enhanced.

Referring to FIG. 3, image text enhancement procedures are discussed. An original image including original text may be captured 302 via a captured device, such as a camera, a video camera. The original image may be included in an image file which retains the image in a graphical format. For example, the image is retained as a series of pixels. The image file may be stored on computer readable media, stored in memory or communicated as desired. In implementations, the image is enhanced to improve image clarity, contrast and so on to increase the likelihood of text enhancement over the text appearing in the captured image.

The original text within the image may be converted 304 into process capable text. For example, the pixilated text "de l'essence" is detected in an original image and converted into computer recognizable text corresponding to "de l'essence". As discussed above, a variety of detection techniques may be used to identify the text within the original image. For example, the text appearing in pixel format may be converted into process capable text based on the shape of the characters within the text, the edges of the characters, and so on. The conversion may result in Unicode or other text which is capable of manipulation by a computer. For example, process capable text may include text in which the underlying encoded data permits computer manipulation of the content as text in contrast to a pixel image format in which the characters are manipulated as a collection of pixels or image components.

Furthermore, the procedure may allow a user to designate only a portion of the text for enhancement. For example, a user may designate conversion of a portion of the text. In other situations, the method may accept user input to override the detected text. For example, if the converted text permits for multiple interpretations a list of possible selections may be presented for user selection or to provide a confidence level associated with the conversion.

The process capable text may be translated 306 from a first language to a second language. For example, the converted process capable text may be translated from a first human language (such as German) to a second human language (such as English). The translation may be accomplished using a wide variety of techniques which may include, but are not limited to, a natural language translation algorithm, a look-up table or database, predictive language modeling, pattern recognition, and so on. A user may designate one or more of the languages. For example, while a user may not be able to comprehend Russian, he/she may be able to designate an expected or predicted first human language based on where he/she is located or on other factors in order to increase translation efficiency over an undesignated language. Additionally, the user may designate the second language according to his/her preference.

In implementations, a text image is generated 308 of the process capable text. Suitable text images may include, but are not limited to, bitmaps, vector graphics, pixel images, and other graphical formats generated from the process capable text. For example, a text image is generated 308 so that the process capable text appears in the same general fashion as the pixilated text included in the original image. If the original image text was presented in a sloping fashion, the text image of the process capable text may be provided in a similar manner with the text enhanced in comparison to the text in the original image. Generating 308 an image of the process capable may permit customization of the resultant image such as by, enlarging font size, providing a different color scheme, using a different font, providing a balloon overlay, enlarging the text region, change the text orientation, selecting generally equivalent words with fewer characters, and so on.

An enhanced image may be formed by augmenting 310 the original image with the generated text image. For example, the text image may be placed in the region in which the pixilated text appeared in the original image. The text image may be overlaid over an unmodified original image.

In further implementations, process capable text may be provided as a layer over the original image or over an enhanced image. Including a process capable text overlay may permit searching, permit presentation or printing of the unmodified original image, and so on. For example, an original image is annotated 312 with a process capable text so that a user may search the text to find a particular vacation picture (including text). The user may additional select to print out the picture with or without the process capable text.

Other suitable annotations may include, but are not limited to, text balloons, audio annotations, image manipulation warnings, highlighted portions. Depending on design preferences, the annotations may be provided as process capable text, as an audio clip, and so on.

The enhanced image may be output 314 as desired. The enhanced image may be output 314 on a video screen, printed as an image, communicated or stored for later presentation. For example, the enhanced image may be automatically output on a screen included associated with the system.

Figure 4:
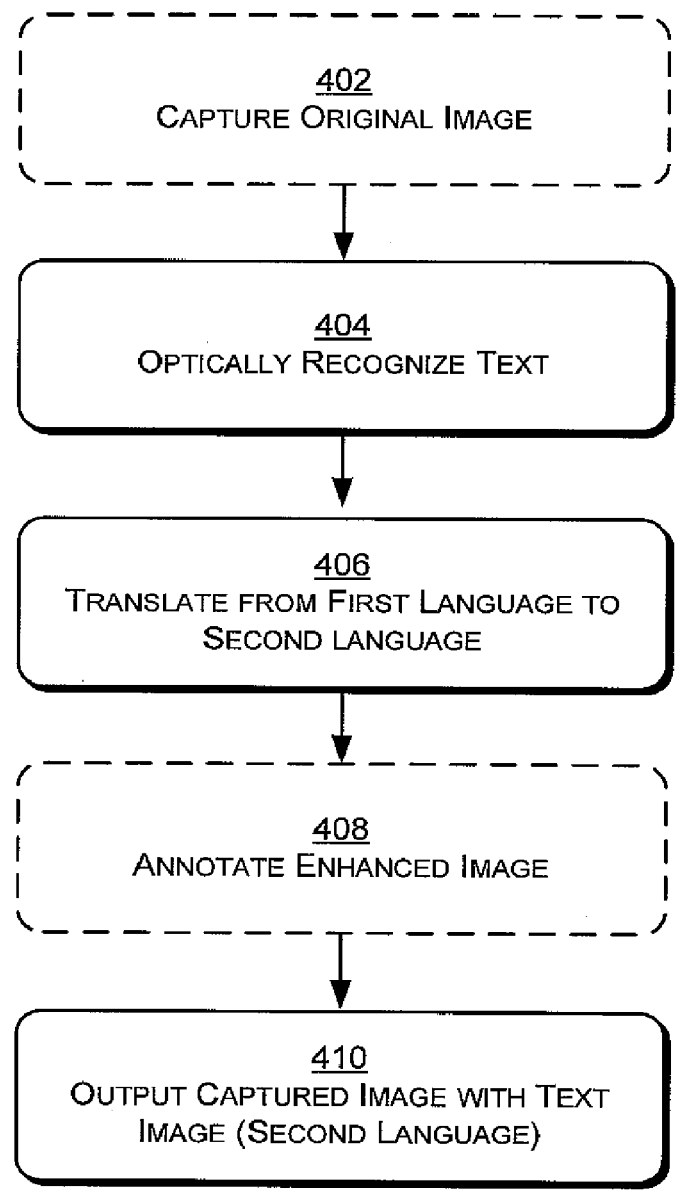
FIG. 4 is a flow diagram depicting a procedure in an exemplary implementation in which second language text replaces original image text.

Referring to FIG. 4, further implementations are discussed in which image text enhancement, over the text appearing in a captured image, is performed. The computer-executable instructions and the procedures discussed herein may be applied by a wide variety of physical devices having processing capability. Suitable devices include, but are not limited to, cameras, video cameras, heads-up displays, personal digital assistants, cell phones and smart phones having image functionality, image captured devices. For example, a camera may capture 402 an original image including text.

The procedure and the computer-executable instructions implementing the procedure may cause a computer to optically recognize 404 text characters included in a captured image. For example, the instructions implement CSER detection to extract text characters included in an image file. Optical recognition 404 may result in the generation of Unicode text or other computer text recognized from the image text. For example, a text region of an image is extracted and the Unicode equivalent of the image text is provided for further manipulation. Other suitable optical text recognitions techniques may be based on one or more of neural network trained classifier, detecting patterns, geometrical determination, texture estimation, contour based detection, and so on to recognize image text. Thus, billboard text, included in an image file, may be optically recognized 404 and implemented as Unicode text or other process capable text.

The process capable text may be translated 406 from a first language to a second language. While a natural language algorithm is discussed, the computer-executable instructions may use other translation techniques, such as one or more of the of the following, statistical text recognition, lookup tables or text databases, artificial intelligence learning, predictive language modeling, pattern recognition, Good-Turing methodologies, and so on. Also, in instances, text from the first language may be converted to symbols or icons in the second language related culture. For instance, a stop sign containing the text STOP is used on roads in some countries while others use a plain red octagon as a stop sign. Thus, translation may produce the icon or symbol as its output either in a process capable representation or as a bitmap. In the previous example, the translation may result in the use of a plain octagon as this symbol may be recognized by a culture employing the second human language.

For instance, upon recognition, a natural language algorithm translates 404 the process capable text from English to Russian text. In this way, the English Unicode text is translated into Russian Unicode text. Translation 404 may be based on the character itself, spacings between characters, capitalized characters, words, phrases, and so on. A user may select the target translation language and/or may input a predicted or expected first language.

In further implementations, process capable text may provide a layer or other annotation 408 over the original image. Including an annotation such as process capable text overlay may permit searching, permit presentation or printing of the unmodified original image, and so on. For example, an original image is annotated 408 with a process capable text so that a user may search the text to find a particular vacation picture (including text). The user may additional select to print out the picture with or without the process capable text.

Other suitable annotations may include, but are not limited to, text balloons, audio annotations, image manipulation warnings, highlighted portions. Depending on design preferences, the annotations may, but are not limited to, process capable text or an audio annotation.

A text image of the process capable text may be included in the captured image in place of the recognized text. For example, a video image output 410 of the captured image with the text image inserted in place of the recognized text is displayed on a video monitor. The output 410 may be customized so that the text image is graphically represented in a manner similar to the optically recognized text. For example, if the optically recognized text was angled in the captured image, a printed output image includes a bitmap of the text image displayed at an angle. While the text image may be presented in a similar manner as the optically recognized text, the text image generated from the process capable text may be further enhanced to promote readability. Text image enhancements may include an enlarged font size, provided in a different color scheme, provided in a different font, provided as a balloon overlay, enlarge the text region, change the orientation, select equivalent words with fewer characters, and so on to promote readability over the original text.

If translation has been selected, a text image of the second language process capable text is utilized as the basis of a text image which is inserted in place of the recognized text. If translation is not desired, the program of instructions may use the process capable text as the basis for the text image. In the previous case, a text image is created from the process capable text and is inserted in place of the initially recognized image text for output 410. Suitable text images may be pixilated or in other graphical formats as desired.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
converting pixilated text, included in an original image, into process capable text that is stored in memory;
generating a text image of the process capable text, the text image being at least one of in a different font than the pixilated text, of a larger font than the pixilated text, or displayed in a different contrast than the pixilated text;
augmenting the original image using a processor with at least one of the text image or the process capable text to form an enhanced image.

2. The method as described in claim 1, further comprising translating the process capable text from at least one of a first human language into a second human language, such that the text image is in the second human language, or from a first human language into a symbol recognized by a culture employing the second human language.

3. The method as described in claim 2, wherein the at least one of the text image or the process capable text is inserted in the image in place of the graphic text.

4. The method as described in claim 3, wherein the text image is a bitmap of a symbol.

5. The method as described in claim 1, wherein the enhanced image is annotated with the process capable text.

6. The method as described in claim 1, wherein the enhanced image is annotated with at least one of a text balloon, an audio annotation, an image manipulation warning, or a highlighted portion.

7. The method as described in claim 1, wherein the enhanced image includes a process capable text overlay.

8. The method as described in claim 1, wherein process capable text is Unicode text.

9. One or more computer-readable memory comprising computer-executable instructions that, when executed by a processor, direct a computing system to:
- optically recognize text included in a captured image as process capable text;
- translate recognized process capable text from a first language into a second language;
- output the captured image with a text image of the second language process capable text in place of the recognized text, the text image being at least one of a larger font than the recognized text, output in a higher contrast ratio than the recognized text, or output in a text balloon overlaid over the captured image.

10. The one or more computer-readable memory as described in claim 9, further comprising annotating the output image with the second language Unicode text.

11. The one or more computer-readable memory as described in claim 9, wherein the text image is a bitmap.

12. The one or more computer-readable memory as described in claim 9, wherein a natural language translation algorithm translates the first language Unicode text.

13. A system comprising:
- an image capture device to obtain an image including original text that stores the original text in memory;
- a text detection module to generate process capable text corresponding to the original text; and
- an output module to output an enhanced image including the image with the original text replaced with a text image of the process capable text, the text image being at least one of a larger font than the original text, output in a higher contrast ratio than the original text, or output in a text balloon overlaid over the image.

14. The system as described in claim 13, further comprising a translation module to translate between process capable text in a first language into process capable text in a second language for output as the text image.

15. The system as described in claim 13, wherein the enhanced image is annotated with the Unicode text.

16. The system as described in claim 13, wherein the text detection module optically recognizes text within the image.

17. The system as described in claim 13, wherein system is included in at least one of a camera, a cellular phone, a smart phone, a video camera, a vehicle, or a wearable item.

18. The system as described in claim 13, wherein the text image is a bitmap.

* * * * *